No. 800,330. PATENTED SEPT. 26, 1905.
J. A. SHEPARD.
ROTARY MOTOR.
APPLICATION FILED MAY 6, 1903.

2 SHEETS—SHEET 1.

WITNESSES: INVENTOR
James A. Shepard
BY
Eugene Diven
ATTORNEY

No. 800,330. PATENTED SEPT. 26, 1905.
J. A. SHEPARD.
ROTARY MOTOR.
APPLICATION FILED MAY 6, 1903.
2 SHEETS—SHEET 2.
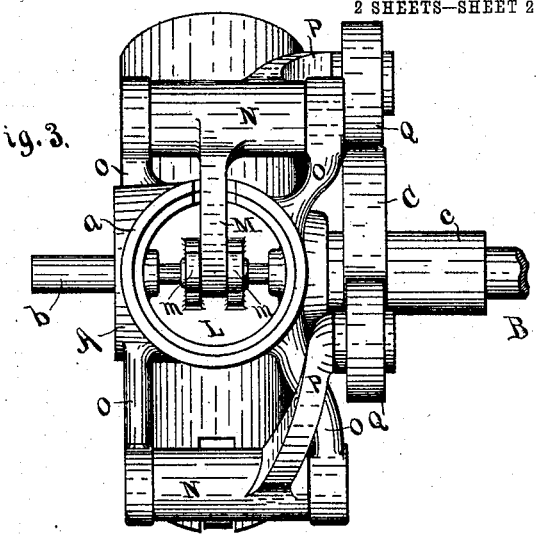
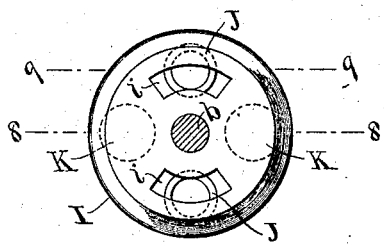
Fig. 4.
Fig. 3.
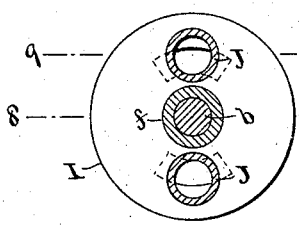
Fig. 5.
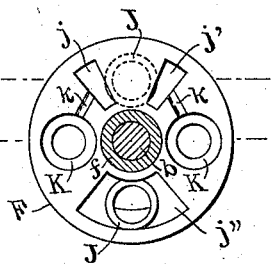
Fig. 6.
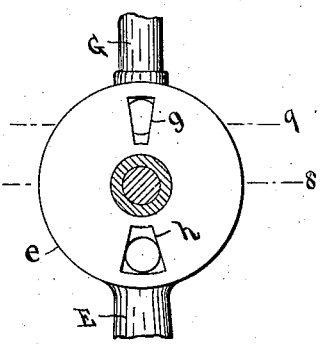
Fig. 7.
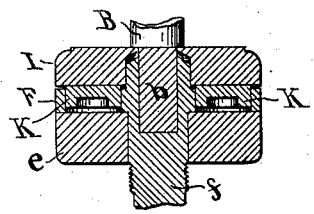
Fig. 8.
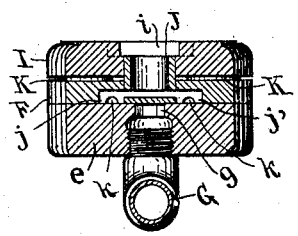
Fig. 9.
WITNESSES:
A. D. Diven
M. E. Verbeck
INVENTOR
James A. Shepard
BY
Eugene Diven
ATTORNEY

UNITED STATES PATENT OFFICE.

JAMES A. SHEPARD, OF MONTOUR FALLS, NEW YORK, ASSIGNOR TO THE GENERAL PNEUMATIC TOOL COMPANY, OF MONTOUR FALLS, NEW YORK.

ROTARY MOTOR.

No. 800,330.  Specification of Letters Patent.  Patented Sept. 26, 1905.

Application filed May 6, 1903. Serial No. 155,867.

*To all whom it may concern:*

Be it known that I, JAMES A. SHEPARD, a citizen of the United States, residing at Montour Falls, in the county of Schuyler and State of New York, have invented certain new and useful Improvements in Rotary Motors, of which the following is a specification.

This invention relates to improvements in rotary reciprocating-piston motors to be driven by compressed air or other fluid under pressure; and the object of my invention is to provide a motor of this type which shall be particularly applicable to hoists, drills, and other portable tools and appliances and which shall embody certain novel features of construction and operation, as will hereinafter be more fully set forth, and pointed out in the claims.

I attain my object by means of the construction and arrangement of the several parts of the motor as illustrated in the accompanying drawings, in which—

Figure 2:
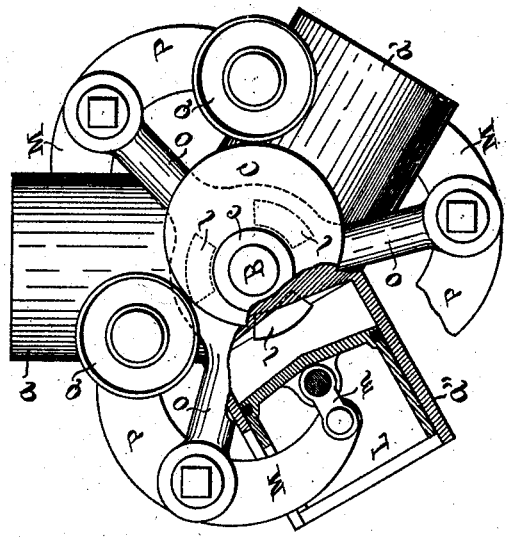
Figure 1:
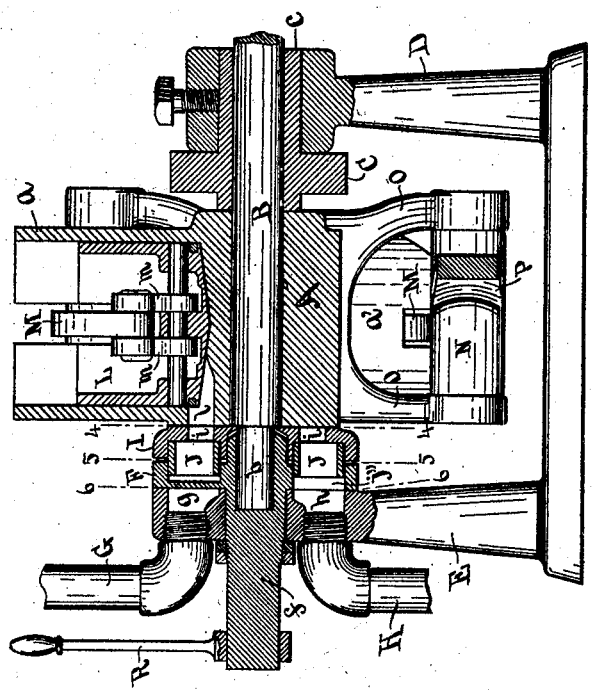

Figure 1 represents a sectional view of a motor embodying my improvements; Fig. 2, a side elevation of the same removed from the bearings and viewed from the right in Fig. 1; Fig. 3, a plan view of the motor-cylinders and piston connections with the valve removed; Fig. 4, an end view of the valve viewed from the right on line 4 4 in Fig. 1; Fig. 5, a section of the same on line 5 5 in Fig. 1 looking from the left; Fig. 6, a section on the line 6 6 in Fig. 1 looking from the left; Fig. 7, a section on line 6 6 in Fig. 1 looking from the right; Fig. 8, a horizontal section through the valve on line 8 8 in Figs. 4 to 7, inclusive; and Fig. 9, a similar section on the line 9 9.

Like letters refer to like parts in the several views.

A represents a hub which is attached to a driving-shaft B, one end of which shaft passes out through the hub $c$ of a stationary eccentric C, which latter is secured in a standard or other support D. Cylinders $a$ $a'$ $a''$ radiate from the hub A. At the other side of the motor a standard E is provided with a circular head $e$, against the inner face of which a revoluble valve plate or disk F is held by means of jam-nuts screwed upon the stem $f$, which projects out through the head $e$. In this stem or hub of disk F the reduced end $b$ of the shaft B is journaled. The motive fluid enters a chamber $g$ in head $e$ by way of the pipe G and is exhausted from chamber $h$ by way of the pipe H. Between the valve-disk F and the face of hub A is a longitudinally-movable packing plate or disk I. This disk I is also revoluble with the disk F, being connected therewith by means of short tubular pieces J, which are fastened to one of the disks and have a sliding fit in the other. The disk F is provided on its outer face with two ports $j$ $j'$, which are adapted to be brought into register with the port leading from the chamber $g$ in the head $e$, when the valve-disk F is turned to the right or left from its central or cut-off position. (See Fig. 9.) From these ports $j$ $j'$ a cross-passage leads to the interior of the upper tube J and thence to the port $i$, whence motive fluid is delivered through ports $l$ in hub A to the cylinders behind the pistons L. Diametrically opposite the port $i$ in disk I is a similar port $i$ for the exhaust from the cylinders. This port leads through the packing-tube J to port $j'''$ in disk F, whence the exhaust passes into chamber $h$ and out through pipe H.

At K K, midway around disk F, between tubes J J, are pistons adapted to receive the motive fluid behind them by way of passages $k$ $k$ and to press disk I against the face of hub A, thereby insuring at all times a close engagement between said plate and hub and forming an effective packing between the valve and the rotating hub.

In order to impart the rotary motion from the pistons to the cylinders, I employ a system of bell-crank levers, comprising the arms M and P, carried by hubs N, supported on brackets formed integrally with the hub A and the cylinders. The arms M are coupled by links $m$ to the pistons, and the bent arms P terminate in rollers, which ride on the stationary eccentric C. The pressure exerted by the pistons on these rollers through the bell-crank levers causes said rollers to travel around the eccentric, thereby imparting rotary motion to the cylinders. Thus if the valve be set so as to deliver the motive fluid to the ports $l$ when the cylinders are passing from the position of the cylinder $a$ to the position of cylinder $a''$ in Fig. 2 the action of the rollers will cause the cylinders to rotate from right to left, whereas if the valve be turned so as to deliver fluid to the cylinders when turning from the position of cylinder $a$ to that of cylinder $a'$ the rotation will be from left to right. By means of the lever R the valve F may be set to cut off the motive fluid or to deliver it to the cylinders at one side or the other of the inlet I, dependent upon the direction in which the motor is to be run and the degree of opening between the ports J J', and the port in chamber $g$ will regulate the speed of the motor. It will be noted that the long radius of the eccentric is set at right angles to the medial position of the valve, or at right angles to the axis of the cylinder $a$, in which the piston is at its inmost position ready for the admission of the motive fluid, from which setting of the eccentric it follows that the admission of motive fluid to the cylinders at one side or the other of the line which is vertical to the long radius of the eccentric will determine the direction of rotation of the motor.

In proportioning the motor parts I so arrange the weights of the arms M and the pistons coupled thereto that they will be approximately counterbalanced by the weights of the arms P and the wheels or rollers carried thereby. By reason of this the centrifugal forces developed at the free ends of the levers M and P and in their attached parts when the motor is running at speed will be practically in balance, so that the pistons and the wheels will be held to their work without undue pressure on either side. The motor is thus rendered free-running and the bearings and coupling-pins are relieved from undue strain and wear. Moreover, the running of the motor will not be affected by changes in centrifugal forces under different speeds, since all centrifugal efforts in the motor parts are practically in balance.

By this arrangement of the motor and valve it will be understood that the valve automatically packs itself and takes up the wear between it and the rotating hub. The motor runs smoothly at high speed, and the bearings and working parts are durable and run with little friction. While I have shown the shaft B journaled in the stationary eccentric-hub, I do not limit myself to this arrangement, as the eccentric may be otherwise supported and the shaft otherwise journaled. The motor and valve are adapted to be readily applied to the containing casing or frame of any of the tools or appliances which can be operated by this class of motors, and variations in the manner of applying the valve and shaft to their supports and bearings may be made without departure from the spirit of my invention. Moreover, where it is not required that the motor shall be reversible the disk F may be made integral with the head $e$, or, in other words, dispensed with, the packing plate or disk I in such case being set with its ports positioned relative to the eccentric, according to the direction in which the motor is to run.

Having thus described the novel features of my motor and valve, what I claim as my invention, and desire to secure by Letters Patent, is—

1. In a motor, a revoluble hub carrying cylinders, ports leading from the cylinders to a face of the hub, a longitudinally-movable packing plate or disk in contact with said face, ports in said plate, admission and exhaust openings adapted to be placed thereby in alternate communication with the cylinder-ports as the hub revolves, slip-joints between the ports in said plates and the admission and exhaust openings, and means for applying the pressure of the motive fluid to said plate to hold it in contact with the hub-face.

2. In a motor, a revoluble hub carrying cylinders, ports leading from the cylinders to a face of the hub, a longitudinally-movable packing plate or disk in contact with said face, ports in said plate, admission and exhaust openings adapted to be placed thereby in alternate communication with the cylinder-ports as the hub revolves, tube-sections forming slip-joints between the ports in said plate and the admission and exhaust openings, and means for holding said plate against the hub-face with a yielding contact.

3. In a motor, a revoluble hub carrying cylinders, ports leading from the cylinders to a face of the hub, a longitudinally-movable packing plate or disk in contact with said face, ports in said plate, admission and exhaust openings adapted to be placed thereby in alternate communication with the cylinder-ports as the hub revolves, slip-joints between the ports in said plate and the admission and exhaust openings, and one or more pistons pressed against said plate from a chamber or chambers in communication with the motive fluid.

4. In a motor, a revoluble hub carrying cylinders, ports leading from the cylinders to a face of the hub, a disk or valve plate in contact with said face, ports in said valve-plate, admission and exhaust openings adapted to be placed thereby in alternate communication with the cylinder-ports as the hub revolves, means for rotating the valve-plate whereby the admission and exhaust ports therein may be shifted to change the point of cut-off or the direction of rotation, a ported packing-plate forming a yielding face for the valve-plate, slip-joints between said packing-plate and the valve-plate at the port-openings, and pistons pressed against the packing-plate from chambers in communication with the motive fluid.

5. In a motor, a revoluble hub carrying cylinders, ports leading from the cylinders to a face of the hub, an admission-opening for the motive fluid, a disk or valve plate in contact with the hub-face, an admission-chamber in said valve-plate, two ports leading to said chamber, one at each side of the admission-opening, a port leading from said chamber to register with the ports in the hub-face, means for turning the valve-plate to change the points of admission and cut-off to the motor-cylinders, a ported packing-plate forming a yielding face for the valve-plate, slip-joints between said packing-plate and the valve-plate at the port-openings, and means for applying the pressure of the motive fluid to said packing-plate to hold it in contact with the hub-face.

6. In a motor, a revoluble hub carrying cylinders, ports leading from the cylinders to a face of the hub, an admission-opening for the motive fluid, a disk or valve plate in contact with the hub-face, an admission-chamber in said valve-plate, two ports leading to said chamber, one at each side of the admission-opening, a longitudinally-movable packing-plate between the valve-plate and hub-face, a port in the packing-plate to register with the cylinder-ports, a slip-joint between said port and the chamber in the valve-plate, pistons pressing against the packing-plate from chambers in the valve-plate, passages between said chambers and the admission-chamber, and means for turning the valve-plate in either direction to open or close the admission-ports.

7. In a motor, a plurality of cylinders carried by a rotating hub, pistons therein, a fixed eccentric at one side of the hub, and oscillating levers rotating with the cylinders, said levers being coupled to the pistons at one end and at the other end carrying wheels or rollers adapted to transmit the force developed by the pistons to the periphery of the eccentric.

8. In a motor, a revoluble hub carrying cylinders, a fixed bearing at one side thereof eccentric to the axis of the hub, pistons within the cylinders, oscillating levers mounted upon and rotating with the cylinders, and means whereby the pressure of the motive fluid upon the pistons is transmitted through said levers to the fixed bearing.

9. In a motor, a revoluble hub carrying cylinders, pistons therein, oscillating levers pivoted between their extremities rotating with the cylinders, one end of said levers being connected to the pistons and the other end being adapted to act upon a fixed bearing eccentric to the axis of said hub.

10. In a motor, a shaft for transmitting the power of the motor, a hub carrying cylinders fixed on and adapted to rotate with the shaft, a fixed bearing eccentric to the shaft at one side of the hub, pistons within the cylinders, oscillating levers mounted upon and rotating with the cylinders, and means whereby the pressure of the motive fluid upon the pistons is transmitted through the levers to the fixed bearing.

11. In a motor, a shaft for transmitting the power of the motor, a hub carrying cylinders fixed thereon and adapted to rotate with the shaft, pistons within the cylinders, oscillating levers pivoted between their extremities rotating with the cylinders, one end of said levers being connected to the pistons, and the other end being adapted to act upon a fixed bearing eccentric to said shaft.

12. In a motor, a revoluble hub carrying cylinders, a cam-surface fixed at one side of the hub, pistons in the cylinders, oscillating levers mounted upon and rotating with the cylinders, and means for transmitting the pressure of the motive fluid upon the pistons through said oscillating levers to the cam-surface.

13. In a motor, a revoluble hub carrying cylinders, pistons therein, and oscillating levers or bell-cranks rotating with the cylinders, one arm of the bell-cranks being coupled to the pistons and the other arm being adapted to act upon a fixed bearing eccentric to the axis of the hub, the latter arm being of sufficient weight to develop during rotation a centrifugal force approximately equal to that of the former arm and its attached piston.

In testimony whereof I have affixed my signature in presence of two witnesses.

JAMES A. SHEPARD.

Witnesses:
M. E. VERBECK,
EUGENE DIVEN.